United States Patent [19]

Payne

[11] Patent Number: 4,671,991

[45] Date of Patent: Jun. 9, 1987

[54] MOLDED PRODUCT

[76] Inventor: LeRoy Payne, 7216 Grand Ave., Billings, Mont. 59106

[21] Appl. No.: 890,539

[22] Filed: Jul. 30, 1986

Related U.S. Application Data

[62] Division of Ser. No. 766,498, Aug. 19, 1985.

[51] Int. Cl.$^4$ .............................................. B32B 5/14
[52] U.S. Cl. ............................ 428/309.9; 428/310.5; 428/318.8
[58] Field of Search ............... 428/309.9, 310.5, 314.2, 428/318.6, 318.8

[56] References Cited

U.S. PATENT DOCUMENTS

| | | | |
|---|---|---|---|
| 3,444,036 | 5/1969 | Russell et al. | 428/318.8 |
| 3,709,843 | 1/1973 | Zocco et al. | 428/314.2 |
| 3,873,656 | 3/1975 | Garner | 428/318.6 |
| 3,919,370 | 11/1975 | Cotterell | 428/310.5 |
| 3,939,021 | 2/1976 | Nishibayashi et al. | 428/310.5 |
| 4,154,785 | 5/1979 | Inui et al. | 428/318.8 |
| 4,206,165 | 6/1980 | Dukess | 428/310.5 |

*Primary Examiner*—William J. Van Balen
*Attorney, Agent, or Firm*—Arthur L. Urban

[57] ABSTRACT

A molded structural panel with substantially parallel major surfaces includes integrally formed thin thermosetting resin high density outer sections. Less dense thermosetting resin foam intermediate sections extend inwardly from the outer sections with the density of the intermediate sections decreasing substantially uniformly with increased spacing from the outer sections. A thin thermosetting resin high density central section is located between the intermediate sections. The high density outer sections are in a stressed state from the pressure of the foam intermediate sections thereon.

6 Claims, 8 Drawing Figures

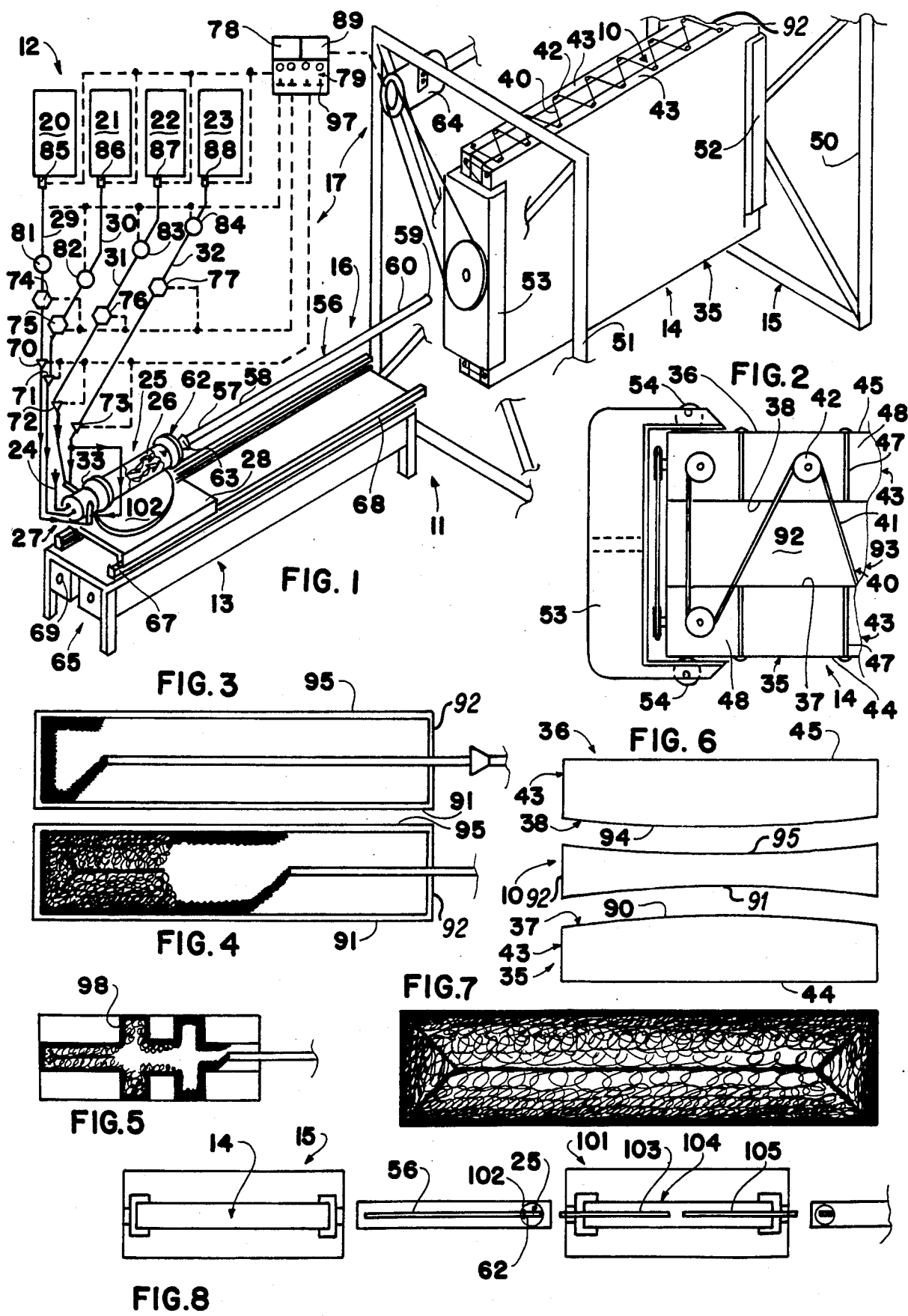

MOLDED PRODUCT

This is a division of application Ser. No. 766,498, filed Aug. 19, 1985.

This invention relates to a novel molded product and to a new method and apparatus for producing same.

Primitive societies constructed buildings using natural materials which were readily available. In forested areas, structures were erectd with logs, either in their original form or as boards that had been cut from the logs. Where trees were less readily available, people used stones or artificial substitutes formed from mud baked in the sun. The walls of the buildings ordinarily were solid structures with a width equal to or greater than that of the material being used.

As civilizations developed and people congregated in towns and cities, it frequenctly was necessary to bring materials considerable distances to the building site. This significantly increased the costs of such materials and thus limited the supply. Because of these factors, builders attempted to utilize scarce materials as efficiently as possible. This led to the use of spaced vertical supports with a covering extending over them.

Such construction has continued to the present day in the use of stud walls with interior and exterior sheathing. This allows the placement of insulation in the spaces between the studs which has become especially important in recent years with the very large increases in energy costs.

Energy prices are only one factor in the continuously growing costs of building. As a result, the construction industry, in an attempt to reduce or at least stabilize housing costs, has proposed the fabrication of subassemblies at centralized manufacturing facilities. These sub-assemblies such as preformed wall sections with finished interior and exterior surfaces and utilities already placed therein are trucked to a building site for assembly.

The erection of a building in this way can be completed in a much shorter time than with the conventional so-called stick construction methods in which complete fabrication and finishing are done on the individual building site. Savings result from preforming because less skilled workmen are able to fabricate and assemble the prefomed components as compared with the conventional building techniques which require the employment of a series of different specialized craftsmen such as carpenters, plumbers, electricians and the like.

Prefabricated buildings have achieved only limited acceptance because of the minimal savings over conventional construction. This is due to the fact that both methods of construction utilize the same materials with only the method of erection being different.

Attempts are being made to substitute different materials as well as change the construction procedures. It has been proposed to employ synthetic materials such as polymeric foams. Liquid polymers are poured into molds and allowed to grow as the foam generated fills the molds.

Overfilling may be employed in an attempt to avoid the development of air pockets and voids. This overfilling, however, creates pressures in the mold. Containing these forces requires that equal counter pressure be applied. In the static molding of small parts such pressures can be controlled relatively easily, but in the casting of large shapes, the large pressures become unmanageable and the costs of counteracting same totally uneconomical.

Another shortcoming of static molding procedures is the non-uniform density of the product. The foam generation occurs in four distinct phases: (1) mixture, (2) cream, (3) foaming and (4) curing.

When a multi-component mixture is placed into a static mold, the mixture begins to foam and grow from the bottom of the mold as a result of an exothermic chemical reaction. The bubble size of the foam is smallest at the bottom where the reaction begins and is largest at the top of the mold as the reaction draws to completion. The resulting product is non-uniform in density from the one side to the other and thus has poor structural strength and is unsatisfactory.

From the above discussion, it is clear that previous construction materials and methods do not provide the innovative products required for low cost energy efficient buildings. Thus, there is a need for new structural products which overcome the deficiencies of earlier materials.

The present invention provides a novel structural panel and a new molding method and apparatus for producing same with features and advantages not found in previous expedients. The panel of the invention has a high degree of thermal insulation and structural integrity. Thus, conventional framing construction methods may be substantially eliminated through the use of the panels of the invention. Also, the panels can be fabricated to provide integrally a wide variety of surface finishes. In addition, the configuration of the panels can be changed easily for special applications.

The new molding method and apparatus of the present invention enable the novel structural panels to be fabricated simply and conveniently at relatively low cost using semi-skilled labor. Commercially available materials can be utilized in the production of the panels.

The rotational molding apparatus of the invention is simple in design. It can be manufactured from commercially available materials and components using conventional metal fabrication techniques and procedures. The apparatus is durable in construction and has a long useful life. Minimal maintenance is required to keep the apparatus in good working condition.

The design of the molding apparatus as well as the steps of the method can be changed to meet the requirements of particular products or operating conditions.

These and other benefits and advantages of the novel structural panel and the rotational molding method and apparatus of the present invention will be apparent from the following description and the accompanying drawings in which:

FIG. 1 is a view in perspective of one form of the rotational molding apparatus of the invention;

FIG. 2 is an enlarged fragmentary edge view of the mold and mold supporting portions of the rotational molding apparatus shown in FIG. 1;

FIGS. 3 and 4 are schematic illustrations of a probe member at different positions within a mold portion;

FIG. 5 is a schematic illustration of a probe member within a different mold portion;

FIG. 6 is a schematic illustration of an edge view of a newly formed structural panel of the invention with frame sections of the mold portion separated;

FIG. 7 is a schematic illustration of an edge view of a structural panel of the invention after the panel shown in FIG. 6 has expanded to its final configuration; and FIG. 8 is a schematic illustration from above of another form of the rotational molding apparatus of the invention.

As shown in the drawings, one form of the novel rotational molding apparatus 11 for molding a structural panel 10 of the present invention includes a chemical supplying portion 12, a chemical mixing portion 13, a mold portion 14, a mold supporting portion 15, a mixture delivery portion 16 and a control portion 17.

The chemical supplying portion 12 of the rotational molding apparatus 11 of the invention includes a plurality of reservoirs 20, 21, 22 and 23. For a thermosetting polyurethane resin panel, 20 may be for an isocyanate, 21 for a polyol, 22 for a fluorocarbon gas foaming agent, 23 for a solvent and 24 an air line.

The chemical mixing portion 13 of the molding apparatus 11 includes a tubular member 25. The tubular member 25 is disposed in a substantially horizontal orientation such as on carriage means 28. A plurality of spaced deflector sections 26 are disposed along the length of the tubular member. The deflector sections are angled with respect to a longitudinal axis of the tubular member. The tubular member 25 advantageously is rotatable on a vertical axis that is substantially perpendicular to a longitudinal axis of the tubular member.

Each reservoir 20-23 of the chemical supplying portion 12 is independently connected to an inlet 27 of the tubular member 25 through flexible connector means shown as conduits 29, 30, 31 and 32 respectively. The chemical mixing portion preferably is connected to the chemical supplying portion through quick release connector means such as a unitary manifold 33.

The mold portion 14 of the rotational molding apparatus 11 of the invention includes a pair of spaced substantially parallel frame sections 35 and 36. Each of the frame sections 35 and 36 includes a continuous major surface 37 and 38 respectively. The continuous major surfaces 37 and 38 face the other of the frame sections, that is, surface 37 faces surface 38.

Connecting means 40 join adjacent edges of the frame sections. The connecting means 40 advantageously includes cable means 41 interlaced between pulleys 42 extending from the edges 43 of the frame sections.

Each of the spaced frame sectiosn 35 and 36 preferably includes a backing member 44 or 45. The backing member is spaced from the major surface 37 or 38 with structural means 46 therebetween. The structural means 46 advantageously includes a plurality of spaced connecting bar members 47. Most preferably, the structural means further includes rigid foam means 48 filling the spaces between the connecting bar members 47.

The mold supporting portion 15 of the rotational molding apparatus 11 of the invention includes spaced upstanding sections 50 and 51. The upstanding sections advantageously are open frame sections as shown or may be other configurations as desired.

Clamping members 52 and 53 are pivotally supported on the upstanding sections. The clamping members extend toward one another and are selectively engageable with opposite edges of the mold portion 14. The clamping members 52 and 53 preferably include cam means 54 to lock the mold portion in the supporting portion.

The mixture delivery portion 16 of the rotational molding apparatus 11 of the present invention includes an elongated hollow probe member 56. The probe member includes an inlet 57 adjacent one end 58 and an outlet 59 adjacent an opposite end 60 thereof. The inlet end 58 is selectively connected with the outlet 62 of the tubular member 25.

The probe member 56 advantageously is axially aligned with the tubular member and has a length greater than the distance between the clamping members 52 and 53. The probe member preferably is connected to the chemical mixing portion 13 through quick release connector means such as a tapered fitting 63.

The control portion 17 of the rotational molding apparatus 11 includes drive means 64 for rotating the mold portion 14 about the mold supporting portion 15. Translating means 65 is employed to move the probe member 56 and the tubular member 25 to which it is secured along the carriage 28 from adjacent one end 67 to adjacent the other end 68 thereof. Advantageously, the translating means may include one or more screw drive members 69. Valve means 70, 71, 72 and 73 are disposed along the length of each of the flexible connector conduits 29-32. Flow measuring means 74, 75, 76 and 77 also are located along each of the flexible connector conduits. The control portion further includes programmable memory means 78 which automatically control the drive means 65, the valve means 70-73 and the flow measuring means 74-77 through actuating means 79 such as solenoid switches and the like.

Advantageously, the control portion includes pump means 81, 82, 83 and 84 located in the conduits 29-32 respectively. It is preferred to include valve means before and after the pump means. Thus, in addition to the valves 70-73, shut-off valves 85, 86, 87 and 88 are located in each conduit.

The pump means 81-84 and the valve means 85-88 also are activated by actuating means 79. Further, the control portion preferably includes coordinating means 89 for the drive 64, the translating means 65, the valve means 70-73 and 85-88 and the pump means 81-84.

A structural panel 10 of the invention may be formed using the rotational molding apparatus 11 employing the following steps of the molding method of the invention. When the design of a panel has been determined, the control portion 17 including memory 78, which may be a computer, is programmed with the necessary processing parameters for the particular structural panel being molded. Next, the mold portion 14 is assembled to provide a mold cavity with the desired configuration. One of the frame sections 35 may be positioned horizontally on a table (not shown) with the inner surface facing upward. If the panel is to have decorative surfaces on both major faces, a pattern or facing material 90, 91 may be placd on the frame section. This facing or pattern may simulate a wall of rock, brick, tile, stucco, wood paneling, or be a covering of material such as sheet rock, wallpaper, fabric or another utilitarian or decorative material. Coverings adhere tightly to the panels because of the strong adhesive characteristics of the resin.

Then, edge sections 92 are positioned in a continuous vertically oriented peripheral configuration 93 and secured together. These edge sections can be strips of metal, wood, drywall, combinations thereof or similar materials as desired.

Thereafter, a second face pattern or material 94, 95 is placed over the free upper edges of the peripheral configuration 93. Next, frame section 36 is lifted into place above the second face pattern 94 and aligned with the other frame section 35. The frame sections 35 and 36 are secured together with cables 41 which are interlaced between the pulleys 42 extending from the edges 43 of the spaced frame sections.

This procedure forms an assembly with a high degree of structural integrity that is ready for the molding operation. With the spacing betwen the frame sections 35 and 36 being filled with the edge sections 92, the mold cavity is completely enclosed. Then, a probe member 56 is positioned along the axis of the cavity and inserted through a suitably sized opening in one of the peripheral sections.

The mold portion 14 is transferred to the mold supporting portion 15 using a suitable carrier (not shown) such as a cart, a crane, a fork lift truck or the like. With the clamping members 52 and 53 in a horizontal orientation, the mold portion is slipped into the openings thereof. Cams 54 then are activated to lock the mold portion between the clamping members. The inlet end 58 of the probe member 56 which extends from the mold portion is connected to the outlet 62 of the tubular member 25 of the mixing portion 13.

Prior to the start of the molding operation, it may be desirable to recheck the calibration of the flow of the resin-forming chemicals to the mixing portion. This can be accomplished by disconnecting the conduits 29 and 30 from inlet manifold 33 and measuring the flow rates manually. At the same time, the reaction rate also can be checked by mixing the chemicals. If the measurements indicate a discrepancy from the specifications, appropriate changes can be entered into the memory 78. The apparatus 11 now is ready for the molding of a panel.

Buttons and/or switches 97 on the control portion 17 are contacted to start the operation of the apparatus 11. This activates the memory 78 and the coordinating means 89 which energizes the drive 64, the translating means 65, valves 70–73 and 85–88, and pumps 81–84 in the preselected sequences. The drive 64 that is connected to both clamping members 52 and 53 begins the rotation of the mold portion 14. Since the mold portion is rotating, the liquid mixture exiting the probe member spreads by centrifugal force over the surfaces adjacent to the probe outlet 59.

The control portion 17 coordinates the operation of the various system components so the required formulation is deposited at the desired areas within the mold cavity as the probe member is being withdrawn. For example, a larger quantity of the mixture may be injected from the probe member adjacent the end of the mold cavity to insure that the adjacent edge sections 92 are evenly coated as well as the intersections thereof with the major surfaces 37 and 38.

As the probe member is withdrawn at a preselected rate, the control portion may change the quantities and/or formulation as required. Similarly, as shown in FIG. 5, if the mold portion includes a number of divider inserts 98 to form a plurality of interconnected cavities, the quantity of the resin-forming mixture delivered at any particular point during the probe withdrawal can be increased or reduced to provide the desired coating of the mold interior.

The components of the liquid mixture deposited on the mold interior quickly begin to react to form the thermosetting resin structure. The mixture initially spread over the mold interior forms a resin coating with a high density primarily due to the greater centrifugal force at the periphery which suppresses or delays bubble formation. As the reaction rate increases due to the exothermic reaction of the resin formation, the foam formed decreases in density.

The foam density decreases substantially uniformly as the spacing from the mold cavity surfaces increases. At the same time, the air within the mold cavity displaced by the foam exhausts out the spacing around the probe inlet. This decrease in density continues until the foams that are expanding toward each other meet. At these boundaries, a thin high density central barrier is formed.

As the withdrawing probe 56 reaches the end of the mold cavity, a final shot of the liquid mixture is blown into the cavity with a pulse of inert gas. This clears the tubular member 25 and the probe member 56 of excess chemicals.

The probe then is separated completely from the mold portion. Sine the probe is supported only by its connection with the tubular member, the free end 60 sags slightly and material remaining in the probe drains into a waste container (not shown). A solvent followed by a burst of air are blown through the tubular member to remove any final traces of the mixture before it can react to form a resin and clog the passages.

The drive 64 is stopped after the probe is removed from the mold portion. Then, with the clamping members 52 and 53 in a horizontal position, the carrier transfers the mold portion 14 to an adjacent location for curing. After the curing period, the frame sections 35 and 36 are separated and the molded panel stored until it has cooled to ambient temperature.

During the cooling step, the expansion of the foam is completed. To insure that the major faces are parallel to one another in the finished product, it is advantageous to provide frame sections with major surfaces 37 and 38 deflected outwardly slightly toward the other frame section at a point adjacent the center thereof. This deflection is shown in an exaggerated illustration in FIG. 6. In actual fact, the deflection may be an inch or so for a 4 by 8 foot panel about 4 inches thick.

This final expansion of the foam after the panel has been removed from the mold portion stresses the high density outer skin or layer of the panel. This stressing of the skin increases the strength and puncture resistance thereof. Thereby, the structural strength of the panel also is increased so that panels of lesser thickness can be utilized as replacements for thicker conventional stud walls. The structural strength of the panels also can be enhanced by including a reinforcement or an open work preform, preferably along the center line of the panel. With this arrangement, it may be desirable to employ a probe on each side of the reinforcement.

Immediately upon removal of the mold portion 14 from the clamping members, another mold portion with a probe member therein can replace the first mold portion and the molding operation described above repeated. Advantageously, a second mold supporting portion 101 may be positioned in alignment with first mold supporting portion 15 on the opposite end of the chemical mixing portion 13 as shown in FIG. 8. With this double molding system, the tubular member 25 may be mounted on a turntable 102 to permit rotation of the member 25 on a vertical axis substantially perpendicular to a longitudinal axis of the mixing portion, that is, to the axis of the translating means 65.

In the operation of such a system, when the probe 56 is withdrawn from the first mold portion 14, the tubular member 25 is at the opposite end of the translating means. Detachment of the first probe member 56 in this position and rotation of the tubular section turntable 102, places the outlet 62 of the tubular member adjacent to a second probe 103 which extends from a second mold portion 104. Attachment therebetween and actuation of the control panel 17 initiates the molding of a second panel even before the first mold portion 14 has been removed from its supporting portion 15. In this way, the productive capacity can be substantially increased.

Another way to increase the production from a molding apparatus 11 of the invention is to employ two probe members each of which delivers the resin-forming mixture to half of the mold cavity. As shown in the right side of FIG. 8, probe members 103 and 105 are located at each end of mold supporting portion 101. With two probes, twice as much of the liquid mixture can be delivered to and spread throughout the mold cavity in a given period.

Structural panels produced in accordance with the present invention can be employed in a wide variety of applications. Since the panels can be molded to provide an exterior finish such as simulated brick, stone, etc. on one side and an interior finish or covering such as drywall or wallpaper on the other side, panels can be assembled in one operation to form the sidewalls of a building. For window or door openings, inserts can be included within the mold cavity to block off a part of the normal configuration. Such door and window opening panels can be located between full panels at the desired locations along a wall.

Interior walls can be constructed in the same way as exterior walls with the appropriate finishes or coverings provided in a mold cavity which possibly is of a narrow thickness. Roof panels can be molded with a shingle or shakes appearance and since the thermosetting resin from which the panels may be formed have good weather resistance, no additional finish or covering is required. Doors for passageways, cupboards and the like can be molded with the apparatus 11 of the invention through the use of the dividing inserts within the mold cavity so a number of smaller pieces can be molded in one operation.

The above description and the accompanying drawings show that the novel structural panel and the molding method and apparatus of the present invention provide features and advantages not previously available. The structural panel of the invention provides a low cost, superior building component which simplifies the erection of buildings. Large panels permit erection in a very short time. Semi-skilled workmen can perform the construction even though they are not expert craftsmen, The high level of thermal insulation and structural integrity allow the panel to be utilized directly in place of conventional stick construction, with significant savings.

The molding method and apparatus of the present invention enable panels to be produced with exterior and interior finishes of many different appearances and textures. Roof and exterior wall panels simulating or covered with shingles, shakes, paneling, stone, brick, etc. can be fabricated, as well as interior panels with or to simulate materials such as plaster, wallpaper, paneling and the like. In addition, special panels with door and window openings and multi-piece molding such as passage and cabinet doors, etc. can be made.

The rotational molding apparatus of the present invention is simple in design and can be manufactured relatively inexpensively. Commercially available materials and components can be used in the manufacture of the apparatus. The apparatus is durable in construction and requires little maintenance.

It will be apparent that various modifications can be made in the particular structural panel, molding method and apparatus of the invention described in detail above and shown in the drawings within the scope of the invention. The size, configuration and arrangement of components can be changed to meet specific requirements.

The panel may be of different shapes such as circles, ovals, triangles, squares, rectangles, hexagons and the like. Flexible probe members may be employed for intricate mold designs. Also, deflecting mixer sections 26 may be positioned along the length of the probe member if desired. The mixing portion may be moved by other mechanisms. These and other changes can be made in the structural panel, molding method and apparatus provided the functioning and operation thereof are not adversely affected. Therefore, the scope of the present invention is to be limited only by the following claims.

What is claimed is:

1. A molded structural panel with substantially parallel major surfaces, said panel including integrally formed thin thermosetting resin high density outer sections, less dense thermosetting resin foam intermediate sections extending inwardly from said outer sections, the density of said intermediate section decreasing substantially uniformly with increased spacing from said outer sections, a thin thermosetting resin high density central section between said intermediate sections, said high density outer sections being in a stressed state from the pressure of said foam intermediate sections thereon.

2. A molded structural panel according to claim 1 wherein said structural panel is a unitary structure.

3. A molded structural panel according to claim 1 wherein said structural panel is formed of the reaction product of an isocyanate and a polyol.

4. A molded structural panel according to claim 3 wherein said intermediate sections include an inert gas foaming agent.

5. A molded structural panel according to claim 1 wherein said panel includes a preformed facing material.

6. A molded structural panel according to claim 1 wherein one of said outer sections has a surface configuration simulating a natural building material.

* * * * *